United States Patent Office 3,116,509
Patented Jan. 7, 1964

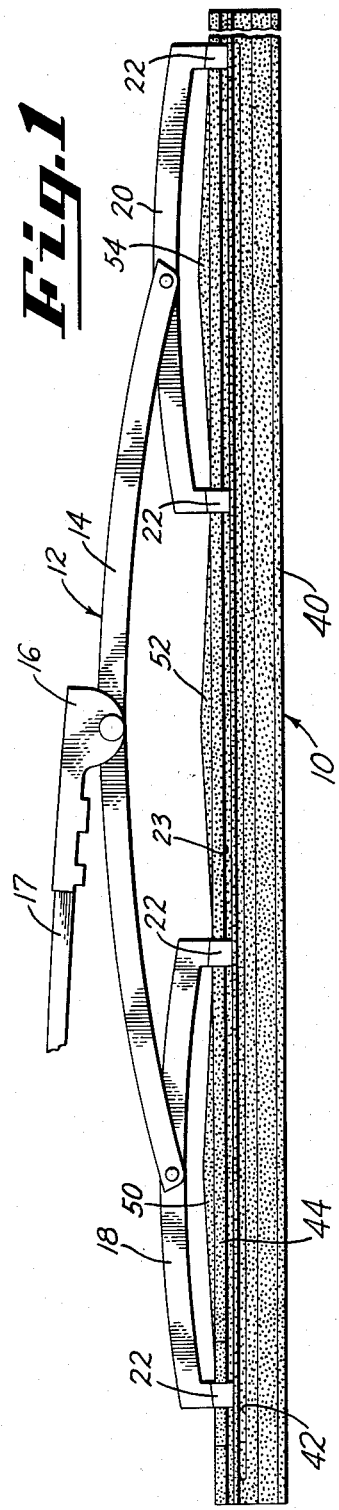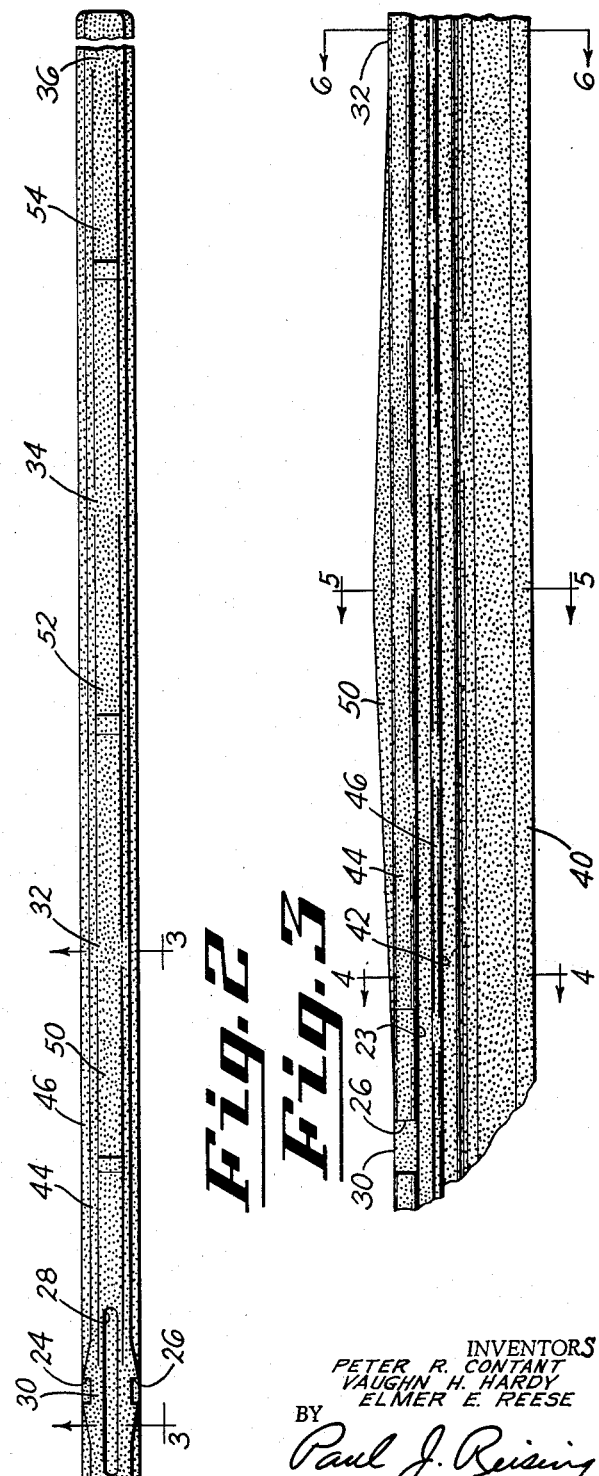

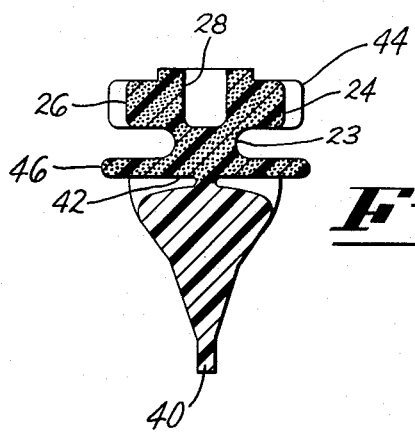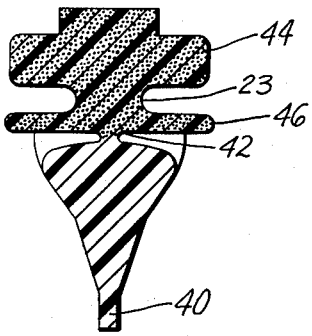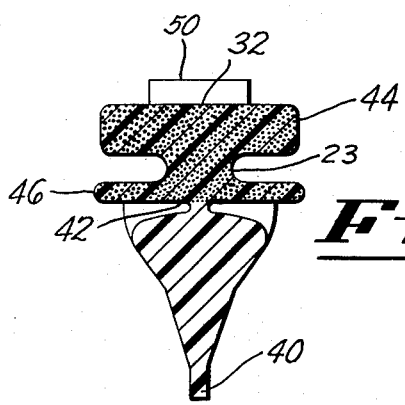

3,116,509
UNITARY SQUEEGEE AND WIPER BLADE
ASSEMBLY EMBODYING SAME
Peter R. Contant, Vaughn H. Hardy, and Elmer E. Reese, Rochester, N.Y., assignors to General Motors Corporation, Detroit, Mich., a corporation of Delaware
Filed Jan. 16, 1961, Ser. No. 83,006
18 Claims. (Cl. 15—250.42)

The subject matter of this invention is a windshield wiper squeegee and assembly incorporating same which constitute improvements in those covered by United States patent application Serial No. 83,005 filed concurrently herewith in the names of Clyde A. Browne and Elmer E. Reese and assigned to the assignee of the present invention, said application being a continuation-in-part of application Serial No. 71,546, filed November 25, 1960.

In the aforementioned patent application there is disclosed and claimed a unitary elastomeric windshield wiper squeegee having longitudinally extending strata of different hardness, the wiping portion being formed at least in part by a soft stratum and the back or retention portion being formed at least in part by a hard stratum to provide the flexing characteristics desired for the wiping of curved as well as flat windshields. The squeegee is carried by a pressure distributing linkage, such as a plurality of pivotally interconnected yokes, having free ends connected to the retention portion of the squeegee at longitudinally spaced points so as to maintain the squeegee in contact with the surface to be wiped. Such structure is highly advantageous over conventional metal backed squeegees and assemblies in that it better assures noiseless operation due to the elimination of metal-to-metal connections between the linkage and the squeegee, greatly reduces the likelihood of windshield scratching from contact of metal parts therewith and reduces cost of manufacture by elimination of relatively expensive operations heretofore required for squeegee assembly. However, the unitary multi-hardness squeegee disclosed in the aforesaid patent application depends almost entirely upon the arrangement of yokes, levers, etc., in the superstructure linkage for the attainment of uniform pressure distribution along the length of the squeegee. As a practical matter, the number of yokes or lever connections with the squeegee must be limited to but a few, on the order of about four, and hence the points of pressure transmitting contact between the linkage and the squeegee will be spaced by a number of inches, particularly where a long blade is required. Hence, while the linkage does serve to distribute the wiping arm pressure to a number of spaced points on the squeegee, there is, nevertheless, some non-uniformity of pressure along the length of the squeegee, the pressure being the greatest at the connections and the lowest at the locations intermediate the connections. In effect then, the portions of the squeegee between pressure points can have a tendency to arch backwardly, away from the surface being wiped, thereby leading to uneven wear and non-uniform wiping action.

The present invention provides a squeegee and a wiper assembly embodying same which obviate the problem alluded to above. Accordingly, among our objects is the provision of a unitary squeegee which assures more uniform pressure distribution throughout the length of the wiping portion thereof. More particularly, it is an object to provide a unitary squeegee comprising a body of rubber or other elastomeric material having longitudinally extending elastomeric strata of different hardness, the wiping portion of the squeegee being formed at least in part by a soft stratum and the retention portion being formed at least in part by a hard stratum shaped to assure improved uniformity of pressure distribution throughout the length of the squeegee. A further object is the provision of a wiper blade assembly comprising a unitary, elastomeric squeegee and a linkage for applying wiper arm pressure to longitudinally spaced apart points on the unitary squeegee, the squeegee being formed to more uniformly distribute the pressure applied at the spaced points.

The aforementioned and other objects are accomplished in the present invention by forming the relatively hard stratum of the retention portion of the squeegee with a varying thickness, the thickness being smallest at the locations of the pressure points and greatest at locations intermediate the pressure points. The resultant unitary squeegee is quite flexible in a plane normal to the surface to be wiped, and less flexible in a plane parallel to the surface to be wiped, and by reason of the varying thickness of the hard stratum has increased resistance to arching away from the surface to be wiped and greatly improves the uniformity of pressure distribution. The unitary squeegee can be interconnected with any suitable type pressure distributing linkage, or superstructure, to form a wiper blade assembly. Thus, the superstructure can comprise a plurality of pivotally interconnected yokes, a plurality of stacked levers, or a combination of yokes and levers to apply wiper arm pressure at a plurality of spaced points along the length of the squeegee.

Further objects and advantages of the present invention will be apparent from the following detailed description of a preferred embodiment thereof made with reference to the accompanying drawings in which:

FIGURE 1 is a longitudinal view, in elevation, of the windshield wiper blade assembly embodying the invention;

FIGURE 2 is a plan view of the unitary squeegee shown in FIGURE 1;

FIGURE 3 is a fragmentary side elevational view of the unitary squeegee shown in FIGURE 1, but in larger scale; and FIGURES 4, 5 and 6 are sectional views taken on the lines 4—4, 5—5 and 6—6 respectively, of FIGURE 3.

With particular reference to FIGURE 1, the wiper blade assembly shown comprises a unitary squeegee 10, hereafter described in detail, and a pressure distributing linkage, or superstructure, 12 which includes a channel-shaped primary yoke 14 having a centrally arranged attaching clip 16 connected thereto by means of a pivot permitting relative pivotal movement between the primary yoke and the clip about an axis transverse to the longitudinal axis of the wiper blade. The clip 16 detachably connects the wiper blade assembly with a conventional windshield wiper arm 17 for applying wiper arm pressure to the wiper blade assembly to thereby maintain the same in engagement with the surface to be wiped. Opposite ends of the channel-shaped primary yoke 14 are pivotally connected by transversely arranged pins to the channel-shaped secondary yokes 18 and 20, intermediate portions of the secondary yokes being disposed between the side walls of the channel-shaped primary yoke in mating relation. The two ends of each of the secondary yokes are formed with pairs of claws, as shown at 22, which straddle the retention or backing portion of the unitary squeegee 10 and serve to secure the squeegee and the yokes in their assembled relationship as shown. These claws have inwardly extending portions disposed in the squeegee grooves 23 and top portions engageable with the upper surface of the squeegee to transmit pressure thereto. In the particular embodiment shown, one end of the upper surface of the retention portion of the squeegee is formed in accordance with the invention covered by United States patent application Serial No. 82,810, filed concurrently herewith in the name of Salvatore L. Latone and assigned to the assignee of this invention, that is, the surface is formed with a pair of oppositely disposed notches 24 and 26 bounded by pairs of tapered cam surfaces and with an elongated slot 28 between the notches and pairs of cam surfaces so as to allow the cam surfaces to be pressed inwardly towards each other. This allows easy assembly of the squeegee with the superstructure; the squeegee is slid through three of the pairs of claws and claw pair 22 is then caused to pinch the cam surfaces inwardly until the claw comes to rest in slots 24 and 26. The edges of the cams adjacent the claw 22 thereafter prevent unauthorized disassembly of the squeegee from the superstructure. It will be noted that this securement means allows some sliding movement between the squeegee and the pairs of claws.

It is manifest that by reason of the pivotal connections between the primary and secondary yokes, the rubber squeegee is free to flex and take an arcuate shape in a plane normal to the surface to be wiped to thereby conform to the shape of the surface. It is also manifest that the total pressure derived from the wiper arm 17 is applied to the squeegee at four spaced points, indicated at 30, 32, 34 and 36, these pressure points being the locations of the claw connections between the secondary yokes and the squeegee.

With particular reference now to FIGURES 2 through 6, the unitary squeegee 10 comprises a flexible, resilient, elongate rubber or rubber-like body having a relatively soft flexible wiping lip portion 40, flexure grooves 42 terminating short of the ends of the squeegee, and a relatively hard retention, or backing portion 44 of greater width than thickness and having a pair of coplanar grooves 23, already alluded to, extending throughout the length thereof. The flexure grooves terminate short of the ends of the squeegee to form reinforced ends, and the relatively hard retention portion is formed with integral flanges 46 having a greater width than the blacking portion thereof and arranged to preclude engagement between the claws of the superstructure and the surface being wiped.

In manufacturing the squeegee two or more laminae of different hardness rubber or rubber-like material can be vertically stacked to extend throughout the length of the squeegee such that after forming and curing there results a unitary structure the wiping portion 40 of which is formed by a relatively soft flexible stratum with a durometer hardness preferably on the order of from about 50 to 65 Shore A, and the retention portion 44 of which is formed at least in part by a harder stratum with a durometer hardness on the order of from about 85 Shore A to 95 Shore D. In the particular embodiment shown the entire retention portion is formed by the hard stratum as indicated in FIGURES 4, 5 and 6 by the darker shading of the retention portion. Since the width of the hard stratum of the retention portion is greater than its thickness the unitary squeegee will have greater flexibility in a plane normal to the surface to be wiped than in a plane parallel to this surface. The desired substantial rigidity in the plane parallel to the surface to be wiped is, of course, also effected by the interconnection of the unitary squeegee with the pressure distributing linkage which is substantially rigid in that plane due to the arrangement of pivots and the nesting relation of the primary with the secondary yokes.

Further in accordance with the invention, the relatively hard rubber or other elastomeric stratum of the retention portion 44 is formed with a substantially continuously varying thickness along its length, the thickness being at its minimum at the locations of the pressure points 30, 32, 34 and 36 and gradually increasing to a maximum at the locations between and equidistant from the pressure points. Hence, the flexibility of the blade in the plane normal to the surface being wiped is greatest at the pressure points and least at the locations intermediate the pressure points. Such structure assures more uniform distribution of the pressure along the entire length of the blade and prevents those portions of the blade between pressure points from arching away from the surface being wiped. In the preferred embodiment shown, the varying thickness is accomplished by forming the back surface of the retention portion hard stratum with ribs 50, 52 and 54 which are substantially uniformly tapered from about the center to the ends thereof to provide the points of minimum and maximum thickness. It will be understood that the ribs, or tapered backing sections, can be made in many varieties of shape, width and thickness to provide optimum uniformity of pressure distribution for any given wiper arm pressure and glass curvature.

If desired, the varying thickness can be accomplished with other structure. For example, the back surfaces of the retention portion can be made flat and the depth of penetration of the hard elastomeric material varied along the length of the blade, the depth of the hard layer being least at the pressure points and gradually increasing to a maximum at the locations equidistant from the pressure points.

It will be seen that in accordance with the invention wiper arm pressure is distributed by the linkage yokes to a plurality of spaced apart points on the unitary squeegee, and is then further distributed evenly along the entire length of the squeegee by the geometry of the retention portion, the result being a better, more uniform wipe pattern and improved wear characteristics.

It will be understood that while the invention has been described by reference to particular embodiments thereof, changes and alternations may be made all within the spirit and scope of the claims which follow:

We claim:

1. A unitary elongate squeegee of elastomeric material having strata of different hardness extending lengthwise thereof, said unitary squeegee being characterized by greater flexibility in a plane normal to the surface to be wiped than in a plane parallel to the surface to be wiped, the cross-sectional area of one stratum varying between spaced points whereby the flexibility in the plane normal to the surface to be wiped varies between such spaced points on said squeegee.

2. A squeegee comprising a flexible, elongate body of elastomeric material having at least one longitudinally extending soft stratum and at least one longitudinally extending hard stratum of varying thickness, the thickness of said hard stratum being at its minimum at spaced points along the length thereof and being at its maximum at locations equidistant from said points.

3. A squeegee comprising a unitary elongate body of elastomeric material having a relatively soft wiping portion extending the length thereof and a relatively hard and wide retention portion extending the length thereof such that said body has greater flexibility in a plane normal to the surface to be wiped than in a plane parallel to said surface, said retention portion being formed to provide varying flexibility between spaced points along the length thereof in the plane normal to the surface to be wiped.

4. A squeegee comprising a flexible, elongate body of elastomeric material having longitudinally extending strata of different hardness and having a longitudinally extending wiping portion along one edge thereof and a longitudinally extending retention portion along the side thereof opposite said edge, said wiping portion being formed at least in part by a soft stratum and said retention portion being formed at least in part by a hard stratum of varying thickness, the thickness of said retention portion being at its minimum at spaced points along the length of said portion and increasing to its maximum at locations intermediate the spaced points.

5. A squeegee comprising a flexible, elongate elastomeric body having longitudinally extending strata of different hardness and having a longitudinally extending wiping portion and a longitudinally extending retention portion, said wiping portion being formed substantially entirely by a soft stratum and said retention portion being formed at least in part by a hard stratum of greater width than thickness and of varying thickness, the thickness of said hard stratum being at its minimum at spaced points along the length thereof and increasing to its maximum at locations equidistant from said points.

6. A unitary squeegee comprising a flexible, resilient, elongate body of elastomeric material having a relatively wide and hard retention portion of varying thickness and a relatively thin soft wiping lip, the thickness of said retention portion being at its minimum at spaced points along the length of said portion and gradually increasing to each side of each of said points to a maximum at locations equidistant from said points.

7. A unitary squeegee comprising a flexible, resilient, elongate elastomeric body having a relatively thin and soft wiping portion and a relatively wide and hard retention portion formed with at least one longitudinally extending rib thereon, the thickness of said rib being greatest adjacent its center and gradually decreasing to a minimum at its ends.

8. A unitary squeegee as set forth in claim 7 having three of said ribs substantially aligned with each other along the length of the retention portion.

9. A windshield wiper assembly including a unitary, elongate squeegee of elastomeric material having an elongate wiping portion and an elongate retention portion, said wiping and retention portions comprising coextensive strata of different hardness elastomeric material, and a pressure distributing linkage comprising a plurality of movable members having connections with said retention portion at longitudinally spaced points thereon, said squeegee being formed such that its flexibility in a plane normal to the surface to be wiped is greater at the locations of said connections than at locations between said connections.

10. A windshield wiper assembly including a unitary flexible, elongate, elastomeric squeegee having a longitudinally extending wiping portion formed at least in part by a soft elastomeric stratum and a longitudinally extending retention portion formed at least in part by a hard elastomeric stratum, and a pressure distributing linkage having connections with said retention portion at longitudinally spaced points thereon, the hard stratum of said retention portion having a varying thickness along its length, the thickness being at its minimum at said connections and being at its maximum at locations intermediate said connections.

11. A windshield wiper assembly including a unitary, elongate squeegee of elastomeric material having a relatively soft wiping portion and a relatively hard retention portion extending the length thereof, and a pressure distributing linkage comprising a plurality of movable members having connections with said retention portion at longitudinally spaced points thereon, the retention portion of said squeegee having a varying thickness along its length such that the flexibility of said squeegee in a plane normal to the surface to be wiped is greater at the locations of said connections than at locations between said connections.

12. A windshield wiper assembly including a unitary, elongate squeegee of elastomeric material having a relatively thin and soft wiping portion extending the length thereof and a relatively wide and hard retention portion extending the length thereof, and a pressure distributing linkage comprising a plurality of movable members having connections with said retention portion at longitudinally spaced apart points thereon, the retention portion of said squeegee having a varying thickness, the thickness being at its minimum at the locations of said connections and gradually increasing to its maximum at locations equidistant from said connections.

13. A windshield wiper assembly including a unitary, elongate squeegee of elastomeric material having a relatively soft wiping portion extending the length thereof and a relatively hard retention portion extending the length thereof, and a pressure distributing linkage comprising a plurality of movable members having connections with said retention portion at longitudinally spaced points thereon, the retention portion of said squeegee having a back surface formed with ribs extending lengthwise thereof between the locations of said connections, each of said ribs being smallest adjacent the connections and greatest intermediate the connections.

14. A windshield wiper assembly including a unitary, elongate squeegee of elastomeric material having a relatively narrow and soft wiping portion extending the length thereof and a relatively wide and hard retention portion extending the length thereof such that said squeegee has greater flexibility in a plane normal to the surface to be wiped than in a plane parallel to the surface to be wiped, and a pressure distributing linkage comprising a plurality of pivotally interconnected members having connections with said retention portion at longitudinally spaced points thereon, the retention portion of said squeegee having a back surface formed with longitudinally extending ribs thereon between said connections, each of said ribs having a varying thickness, the thickness being at its minimum adjacent the connections and gradually increasing to its maximum at the location equidistant from the connections.

15. A unitary squeegee comprising coextensive longitudially extending strata of different hardness flexible material, the configuration and arrangement of said strata resulting in a squeegee having greater flexibility in a plane normal to a surface to be wiped than in a plane parallel to such surface, the flexibility in the plane normal to the surface to be wiped varying between spaced points on said squeegee.

16. A unitary squeegee comprising coextensive longitudinally extending strata of different hardness flexible material including at least one longitudinally extending soft stratum constituting a wiping portion and a relatively hard stratum constituting a retention portion, the flexibility of said retention portion in a plane normal to the surface to be wiped varying between spaced points therealong.

17. A unitary squeegee comprising coextensive longitudinally extending strata of different hardness flexible material including a relatively soft stratum constituting a wiping portion and a relatively hard stratum constituting a retention portion, the thickness of said retention portion varying between spaced points along the length thereof whereby said squeegee has different degrees of flexibility in a plane normal to a surface to be wiped between spaced points therealong.

18. A unitary squeegee comprising coextensive longitudinally extending strata of different hardness flexible material including a relatively soft stratum constituting a wiping portion and a relatively hard stratum constituting a retention portion, the cross-sectional area of said retention portion varying between spaced points along the length thereof whereby said squeegee has different degrees of flexibility in a plane normal to a surface to be wiped between such spaced points.

References Cited in the file of this patent

UNITED STATES PATENTS

| | | |
|---|---|---|
| 1,825,376 | Vaughn | Sept. 29, 1931 |
| 2,099,030 | Morrison | Nov. 16, 1937 |
| 2,741,791 | Scinta | Apr. 17, 1956 |
| 3,003,174 | Anderson | Oct. 10, 1961 |

FOREIGN PATENTS 755,120　　Great Britain _____ Aug. 15, 1956

OTHER REFERENCES

Germany, F 17,814 II/63C, Dec. 20, 1956.